May 5, 1953
A. F. SPERRY
2,637,496
INTEGRATOR
Filed Oct. 30, 1951
2 SHEETS—SHEET 1
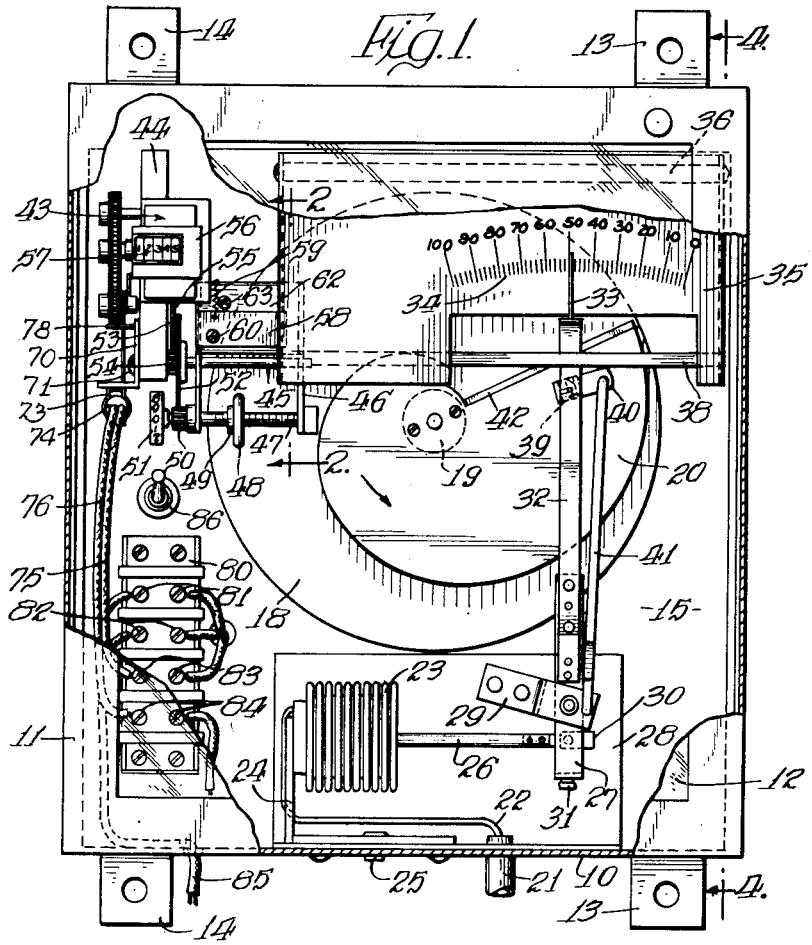
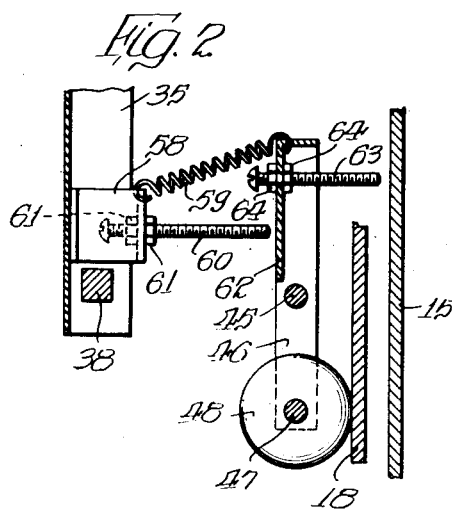
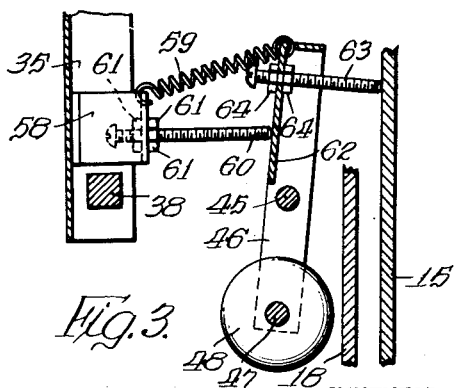
INVENTOR.
Albert F. Sperry
BY
Kegan and Kegan
Attys.

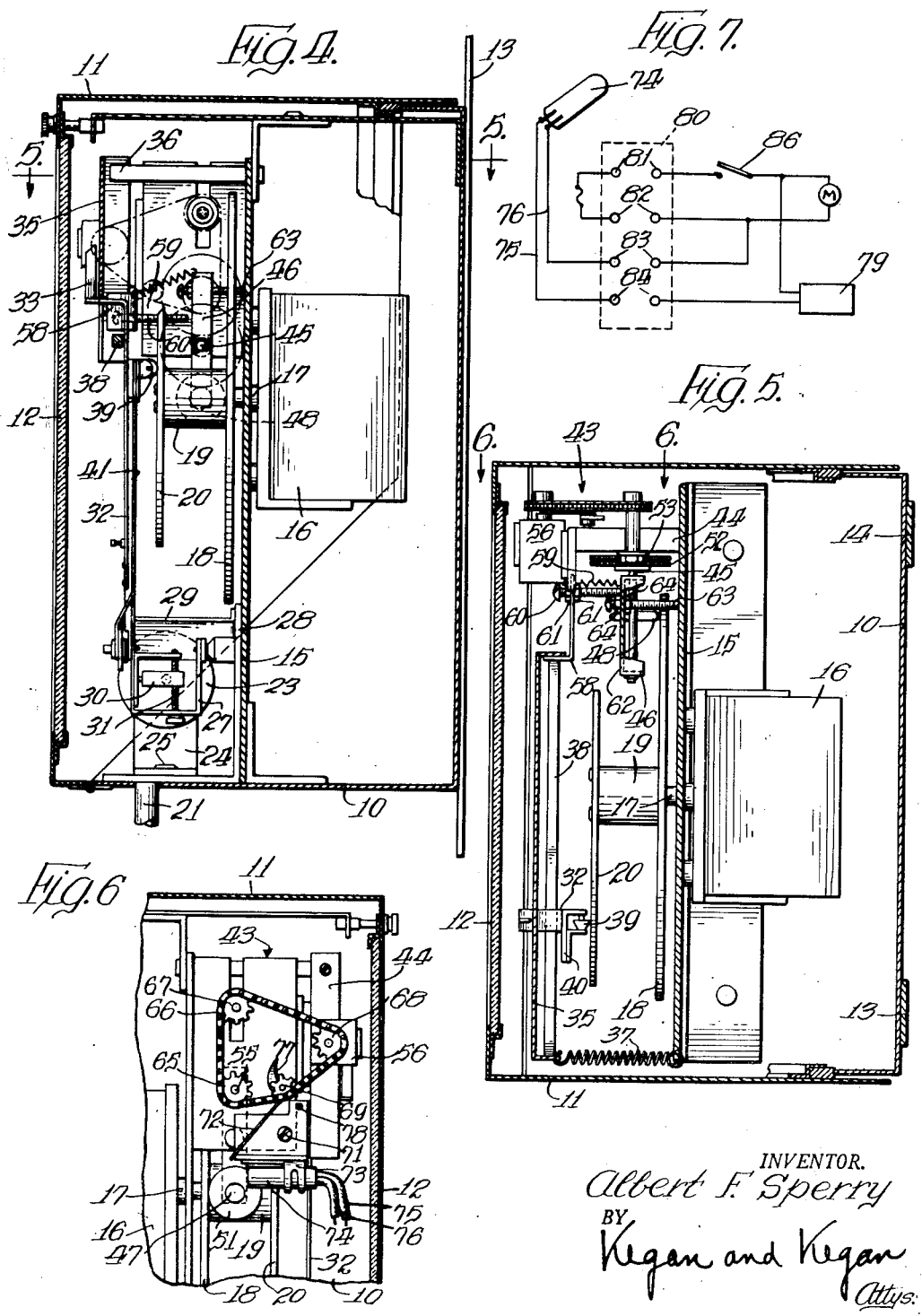

Patented May 5, 1953

2,637,496

UNITED STATES PATENT OFFICE 2,637,496

INTEGRATOR

Albert F. Sperry, Chicago, Ill., assignor to Panellit, Inc., Chicago, Ill., a corporation of Illinois Application October 30, 1951, Serial No. 253,766

5 Claims. (Cl. 235—61)

My invention relates generally to measurement apparatus, and more particularly to apparatus adapted to measure and integrate instantaneous values of a variable, such as for example flow measurement as determined by pressure differentials.

A principal object of my invention is to provide measuring apparatus which accurately measures and integrates instantaneous values of a variable.

Another important object of my invention is to provide measuring apparatus which may be easily calibrated and adjusted in the field.

Another object is the provision of measuring apparatus which may be quickly and inexpensively converted from linear correction to non-linear correction, and vice versa, of the variable undergoing measurement.

Still another object of my invention is to provide measuring apparatus which gives a direct reading at the instrument, and which also is adapted to actuate a recorder at a distance.

In its broad aspect, my measuring apparatus comprises, in combination, a turntable and means for rotating the turntable at a constant angular velocity, a cam rotatable with the turntable, the arcuate distances across one surface of the cam at different radii varying according to a desired function such as for example a linear or square root relation, a member positioned adjacent to the cam and deflected thereby as the cam rotates, means for varying the position of the member relative to the center of rotation of the cam as the magnitude of the variable changes, a rotatable wheel on a movable support, the wheel being engageable with the turntable upon deflection of said support, means interconnecting the wheel support and the cam deflected member to coordinate (1) engagement of the wheel with the turntable, with (2) the movement of the cam operated member, and counting means drivably connected to the wheel.

In order that my invention may be more fully disclosed, reference is had to the accompanying drawings, which illustrate one form of measuring apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that my invention is not restricted to the particular details recited in the specification or shown in the drawings.

In the drawings:

Figure 1 is a front elevational view, with some parts in section, of measuring apparatus embodying my invention;

Figure 2 is a side view taken in section on the line 2—2 of Figure 1, showing the apparatus in the engaged, or counting position;

Figure 3 is similar to Figure 2 except that the apparatus is shown in the inactive, or non-counting position;

Figure 4 is a general side view taken in section on the line 4—4 of Figure 1;

Figure 5 is a top view taken in section on the line 5—5 of Figure 4;

Figure 6 is a detail side view as seen from the line 6—6 of Figure 5; and

Figure 7 is a wiring diagram of the apparatus shown in Figures 1-6.

Like reference characters designate like parts in the drawings and in the description of my invention which follows hereafter.

Turning now to the drawings, and more particularly to Figures 1, 4 and 5 thereof, my measuring apparatus is shown as being housed in a case 10 which is provided with an outer, removable cover 11 having a viewing window 12 in the front thereof. The case 10 may be attached to a wall, column, or face of a panel by means of the attaching straps 13 and 14. The interior of the case 10 is divided by an upright partition 15, on the back of which partition is mounted a synchronous drive motor 16. A drive shaft 17 extends from the motor 16 through the partition 15, and rotates the turntable 18 at a constant angular velocity. A stub shaft 19 in turn extends from the turntable 18, and carries upon it a removable plate cam 20. The variations in shape which the plate cam 20 may take, and the reasons for such different shapes, will be discussed below.

Referring now more particularly to Figures 1 and 4, the bottom of the case 10 is pierced by a conduit 21 through which a pressure inlet connection 22 is led to the receiver bellows 23. The bellows 23 is supported by the bracket 24 which is adjustably positionable relative to the bottom of the case 10, and is secured in the desired position by the fastener 25. The bellows 23 is adapted to be actuated by a pressure force, which for example may be a differential air pressure force transmitted from a flow meter transmitter. As the bellows receive varying pressures, the armature 26 thereof moves in or out accordingly.

Still referring to Figures 1 and 4, a yoke 27 is pivotally mounted between the plate 28 on the partition 15, and the bracket member 29 extending from the plate 28. The armature 26 of the bellows 23 is pivotally fastened to the block 30 which is adjustable along the screw 31 of the yoke 27. In this way, the effective radius arm of the yoke 27 may be adjusted, as desired. Extending upwardly from the yoke 27 is a lever 32 which is made flexible for a purpose to be described below. The pointer 33 of the lever 32 is movable along the scale 34 on the housing 35. Said housing 35 pivots about the shaft 36 (Figure 1), and is urged to move toward the plate cam 20 by the helical spring 37 (Figure 5). Extending along the lower portion of the housing 35, and positioned parallel to the shaft 36, is a freely rotatable bar 38, against which the lever 32 presses. As best shown in Figures 4 and 5, the lever 32 is provided with a roller 39 which is mounted on the arm 40. One end of the arm 40 is pivotally connected to the lever 32, while the other end is pivotally connected to one end of a link 41. The other end of the link 41 is pivotally connected to the fixed bracket member 29, as is best shown in Figure 1. This pivoted linkage thus maintains the roller 39 substantially perpendicular to the leading, beveled edge 42 of the plate cam 20, regardless of the position of the lever 32 relative to said cam 20. This construction thus eliminates the error caused by said thrust upon the roller 39, which otherwise would occur due to said roller 39 not being perpendicular to the edge 42 of the plate cam 20.

The position of the housing 35 controls the operation of the counting unit which is shown generally by the numeral 43. More particularly, the counting unit 43 includes a main support 44 from which extends a first shaft 45. As best shown in Figures 2 and 3, a yoke 46 is rotatable about the shaft 45 and provides support for the second shaft 47. Said shaft 47, while rotatable, is threaded to receive the friction drive wheel 48, which may be formed for example from such material as rubber, and which is adjustably secured to the shaft 47 by the retainer nut 49. The one outer end of the shaft 47 includes a small pinion gear 50 and a calibrating dial 51. The gear 50 meshes with the gear 52 which idles on the first shaft 45 and which in turn drives the gear 53 through the pinion 54. The shaft 55, which is driven by the gear 53, actuates the counter 56, which records on the register 57.

It will be apparent that each time the drive wheel 48 contacts the turntable 18, that the shaft 55 of the counter 56 will rotate, the angular velocity with which the shaft 55 turns depending upon the reduction obtained through the intermediate gear train. In order to control the engagement of the wheel 48 with the turntable 18, the housing 35 is provided wtih a bracket 58 which is connected to the yoke 46 by the helical spring 59. In addition, the bracket 58 serves as a support for the bolt 60 which is held securely in place by the retainer nuts 61, 61. The yoke 46 is in turn provided with a plate 62 from which projects the bolt 63 which is held securely in place by the retainer nuts 64, 64.

The interaction and reason for the various elements described thus far will be more apparent from a consideration of the description of the operation of the apparatus which follows. The fundamental forces which act upon the instrument to provide a measure of the variable under measurement, comprise pressure impulses which are transmitted to the bellows 23 through the inlet connection 22. As these impulses change in magnitude, the position of the lever 32 relative to the scale 34 changes accordingly. In the example shown in the drawings, the scale 34 is linear, such as for example might be the case where flow is being measured and the pressure input to the bellows is linearly proportional to said flow. This would be the case where the transmitter comprises an area type meter, rotameter, or an orifice meter whose reading has been corrected so as to be proportional to the square root of the differential pressure at the orifice.

As the position of the lever 32 changes in accordance with changes in the magnitude of the pressure transmitted to the bellows 23, the turntable 18 and the cam 20 thereon are rotating as a unit at a constant angular velocity in a counterclockwise direction, as viewed in Figure 1. Thus, each time the cam 20 rotates, the beveled edge 42 contacts the roller 39 on the arm 40, whereupon said roller 39 rides up upon the surface of the cam 20. This acts to deflect the flexible lever 32 to the position shown in Figure 4, which in turn swings the housing 35 outwardly against the opposition of the helical spring 37. This latter position of the housing 35 is maintained so long as the roller 39 is supported by the cam 20. The interval of time in each complete revolution of the cam 20 during which the roller 39 is contacted by said cam is a function of the distance of the roller 39 from the center of the axis of rotation of the cam 20. As will be apparent upon examination of Figure 1, as the lever 32 is displaced radially outwardly along the cam 20, the length of time during which the roller 39 rides upon the cam 20 decreases. Since in the embodiment shown the scale 34 is linear, so too is the relationship between the position of the lever 32 from the axis of rotation of the cam 20, and the length of the arc traversed on the surface of the cam 20 by the roller 39.

Whenever the roller 39 is engaging the cam 20, the housing 35 is in the position shown in Figure 2. Hence the yoke 46 is displaced so that the friction drive wheel 48 engages the turntable 18. Whenever the roller 39 moves off of the cam 20, the spring 37 immediately pulls the housing 35 to the position shown in Figure 3, whereupon the yoke 46 is deflected to disengage the wheel 48 from the turntable 18. Thus, the position of the lever 32 relative to the center of rotation of the cam 20 determines the interval of time during which the wheel 48 engages the turntable 18. Whenever the wheel 48 is thus engaged, the shaft 47 rotates, and in turn rotates the shaft 55 of the counter 56 through the interconnecting gear train. In this fashion, the initial impulses to the bellows 23 are accurately converted into a reading at the register 57.

In some installations it is necessary that the cam 20 be other than linear, to accurately integrate the values of the variable undergoing measurement. No problem exists in such a case, however, since it merely requires that the linear cam 20 be replaced by a suitably contoured cam, and the scale 34 changed to read in a corresponding manner. Thus, in the case where the pressure which actuates the bellows 23 is produced by an orifice meter whose reading is directly proportional to the differential across the orifice, rather than to the flow itself, then it is necessary that a cam providing a square root corrective function be substituted for the linear cam 20 shown. This modification is necessary since flow is proportional to the square root of the pressure differential at the orifice.

As the apparatus has thus far been described, to obtain an integrated reading it is necessary to take a visual reading of the register 57. In many installations, however, it is important that the integrated readings be transmitted to a remote station, for such purposes as providing a more convenient reading, or for process control. To this end, my apparatus may include an electrical impulse counting device. As best shown in Figures 1 and 6, a sprocket 65 is fixed to the countershaft 55. The sprocket 65 in turn drives the link belt 66 mounted upon the idler sprockets 67, 68 and 69. Positioned below the link belt 66 is a bracket 70 which is turnable on the pin 71. A hair spring 72 acts to hold the bracket 70 in the position shown in Figure 6. Suspended below the bracket 70 and retained by the spring clip 73, is a mercury switch 74 from which the two leads 75 and 76 extend. As the idler sprocket 69 is rotated, the trigger 77 thereon rotates correspondingly, to engage the trip pin 78 extending outwardly from the bracket 70. Each time that the trigger 77 engages the pin 78, it rocks the bracket 70 against the restraint of the hair spring 72 to close the switch 74. Immediately after the trigger 77 has moved out of engagement with the trip pin 78, the spring 72 returns the bracket 70 to its normal position, whereupon the switch 74 again opens. In this way, a series of impulses is generated which in number are proportional to the integrated instantaneous measurements, as received and recorded by the meter. These impulses are in turn transmitted to the impulse-type counter 79, shown schematically in Figure 7.

As will be apparent upon examination of Figure 7, the electrical circuit of the apparatus is relatively simple. A terminal block 80 is secured to the partition 15, and includes four pairs of terminals 81, 82, 83 and 84. One side of the terminals 81 and 82 is connected to a source of electrical energy, through the conduit 85 (Figure 1). The other two sides of the terminals 81, 82 are connected to the synchronous drive motor 16 through the switch 86. The impulse counter 79 is in parallel with the motor 16, but is connected through the terminals 83 and 84 so that the mercury switch 74 is in series with said impulse counter 79.

Advantageously, my novel apparatus includes a variety of adjustments which facilitate greatly the calibration of the instrument upon installation. Thus the bracket 24 on which the bellows 23 is mounted may be moved by loosening the fastener 26, so that the pointer 33 is in register with its corresponding value on the scale 34 at any beginning test pressure. The screw 31 on the yoke 27 provides means for adjusting the relative position of the block 30 along the radius arm of said yoke 27. In this way the pointer 33 may be set to move the given distance along the scale 34 for a given pressure change transmitted to the bellows 23. Another convenient adjustment is provided through the adjustability of the drive wheel 48 along the shaft 47. The retainer nut 49 may be backed off to permit this adjustment whereupon it is again tightened against the wheel 48 when the desired position is obtained. Adjustment of the drive wheel 48 along the shaft 47, and hence relative to the radius arm of the turntable 13, permits adjustment of the proportionality between the interval of time during which the housing 35 is deflected, and the increment thereby added to the register 57.

To simplify both checking the proper setting of the instrument on installation, and also to make any adjustments which may be necessary, the calibrating dial 51 is provided. In practice the small calibrating dial 51 rotates at a much higher angular velocity than the shaft 55 which drives the counter 56. Since this ratio is known, it is easier to check the counter against the known rate of flow through observation of the dial 51, than by reading the counter register 57. Thus, for example, in one commercial embodiment of my invention, the counter registers 100 units of flow in one hour at 100% scale, while the calibrating dial 51 rotates 3.56 R. P. M. at 100% scale. Since there are ten units on the dial 51, this becomes 2136 units per hour on the calibrating dial, or a ratio of 21.36 units at the dial 51 for every one unit at the register 57. Accordingly, it is much more convenient and less time consuming to check and adjust the counter 56 through observation of the dial 51, than through direct observation of the counter register 57.

Having therefore disclosed my invention for measuring and integrating apparatus, and demonstrated its utility by reference to a specific embodiment thereof, I claim:

1. In measuring apparatus, means for integrating instantaneous values of a variable, comprising: a turntable, means for rotating said turntable at a constant angular velocity, a plate fixed to said turntable for rotation therewith, said plate including a first edge portion extending substantially radially of the axis of rotation of said turntable, said plate further including a circumferential edge portion which connects the two ends of said radial edge portion, the generation of said circumferential edge portion proceeding according to a desired predetermined function, a housing positioned adjacent to said plate, means hingedly mounting said housing for swinging movement, a bar carried by said housing and positioned substantially parallel to said hinge means, spring means connected to said housing to urge the same toward said plate, stop means preventing said housing from contacting said plate, a pivoted, flexible lever bearing against said bar on said housing, means for shifting said lever along said bar toward and away from the axis of rotation of said turntable as the variable being measured changes in magnitude, a roller carried by said lever and positioned for engagement by said plate, the interval of time during which said roller is engaged by said plate during each revolution of the latter depending both upon the shape of said plate and upon the relative position of said lever along said bar, said housing being deflected away from said plate when said roller is engaged by said plate, a pivoted support adjacent said turntable, a rotatable shaft carried by said support and a wheel adjustably fixed to said shaft, means on said housing for rocking said support to drivably engage said wheel with said turntable each time said housing is deflected away from said plate, and a mechanical counter driven by said wheel shaft.

2. In measuring apparatus, means for integrating instantaneous values of a variable, comprising: a turntable, means for rotating said turntable at a constant angular velocity, a plate cam fixed to said turntable for rotation therewith, the arcuate distances across one surface of said cam at different radial distances from the axis of rotation of said turntable varying according to a desired function, a housing positioned adjacent to said cam, means hingedly mounting said housing for swinging movement, spring means urging said housing toward said cam, stop means preventing said housing from contacting said plate, a pivoted lever bearing against said housing, said lever being moved by said surface of said cam to deflect said housing, means for shifting said lever relative to the center of rotation of said cam as the variable being measured changes in magnitude, the interval of time during which said lever is moved to deflect said housing depending upon which portion of said cam moves across said lever, a rotatable frame adjacent to said turntable, a wheel rotatably mounted on said frame, said wheel being engageable with said turntable upon deflection of said frame, means interconnecting said housing and said frame to deflect said wheel into engagement with said turntable when said cam deflects said lever and thereby deflects said housing, and counting means drivably connected to said wheel.

3. In measuring apparatus, means for integrating instantaneous values of a variable, comprising: a turntable, means for rotating said turntable at a constant angular velocity, a cam rotatable with said turntable, the arcuate distances across one surface of said cam at different radii varying according to a desired function, a member positioned adjacent to said cam and deflected by said cam surface as said cam rotates, means for varying the position of said member relative to the center of rotation of said cam as the magnitude of said variable changes, a first shaft parallel to the plane of said turntable, a yoke rotatable on said shaft, a second shaft, said second shaft rotatably mounted in said yoke substantially parallel to said first shaft, a wheel removably secured to said second shaft and engageable with said turntable upon swinging movement of said yoke on said first shaft, a first gear rotatable on said first shaft and counting means driven by said first gear, a second gear fixed to said second shaft and meshed with said first gear, and means connecting said member and said yoke to engage said wheel and said turntable when said cam deflects said housing.

4. Apparatus of the type defined in claim 3, in which said member comprises a pivoted lever and a roller positioned thereon to engage said cam.

5. Apparatus of the type defined in claim 4, in which said means connecting said lever and said yoke comprise a frame and means hingedly mounting said frame, a bar carried by said frame and contacting said lever on the side opposite said cam, spring means urging said frame toward said cam, a bracket extending from said frame, a spring between said yoke and said bracket acting to swing said wheel into engagement with said turntable when said frame is deflected by said lever, and an arm on said bracket which engages and moves said yoke to the disengaged position when said frame is not deflected by said lever.

ALBERT F. SPERRY.

References Cited in the file of this patent

UNITED STATES PATENTS

| Number | Name | Date |
|---|---|---|
| 529,365 | Connet et al. | Nov. 20, 1894 |
| 1,070,968 | Ledoux | Aug. 19, 1913 |
| 2,088,568 | Beecher | Aug. 3, 1937 |
| 2,329,400 | Leone | Sept. 14, 1943 |